April 9, 1940.   G. S. BRACCHIGLIONE   2,196,289
SEEDER
Filed March 29, 1938
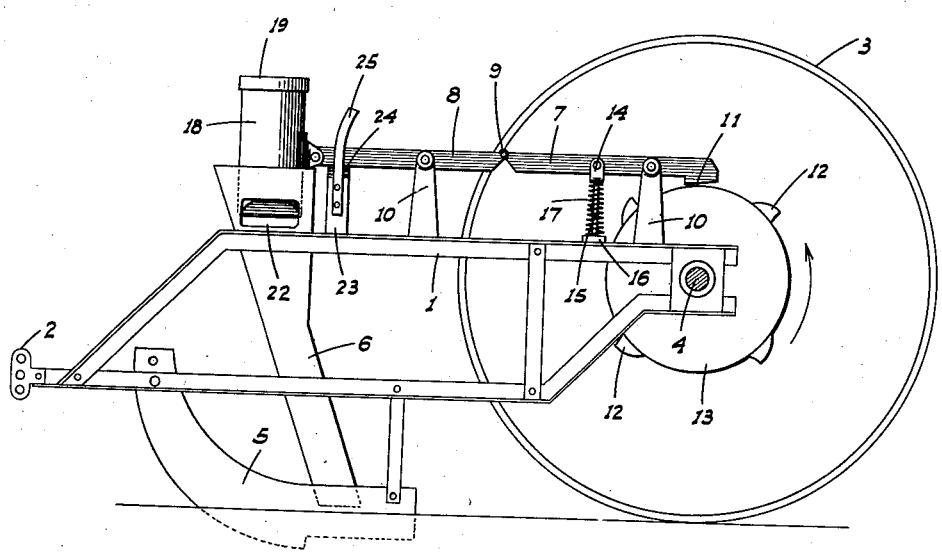
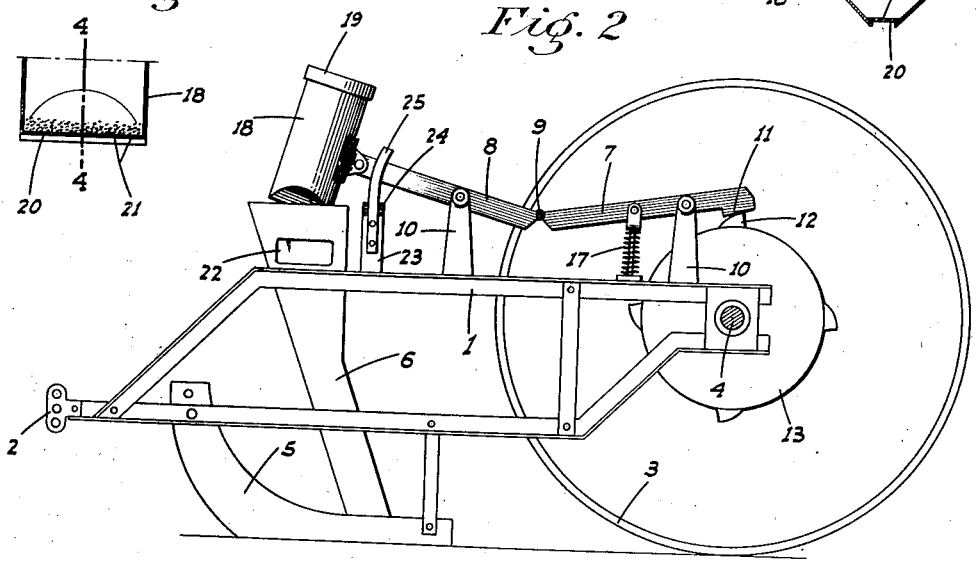
INVENTOR
G. S. Bracchiglione
BY
ATTORNEY Patented Apr. 9, 1940

2,196,289

UNITED STATES PATENT OFFICE 2,196,289

SEEDER

Giacomo S. Bracchiglione, Clements, Calif.

Application March 29, 1938, Serial No. 198,665

5 Claims. (Cl. 111—37)

This invention relates in general to an agricultural implement and in particular is directed to a crop seeder.

With certain seeds, such as tomato seeds and which are now being planted directly in the field rather than transplanted to the field as heretofore, the seeders commonly used for grain and the like are not satisfactory and will not feed the seeds properly. The reason for this is the fact that certain seeds, of which tomato seeds are typical, bear a fuzz which prevents ready separation thereof in the seeder. Also, the seeds are soft and the separating action must be mild else many seeds will be destroyed in the seeder.

It is therefore the principal object of my invention to provide a row crop seeder which will effectively and properly distribute tomato seeds and the like without injury thereto.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation showing somewhat diagrammatically my improved seeder in inoperative position as between seed discharging operations.

Figure 2 is a similar view illustrating the seeder in position immediately before seed discharging movement of the seed container.

Figure 3 is an enlarged, fragmentary sectional elevation of the seed container and seed feeding plate.

Figure 4 is a cross section taken on line 4—4 of Fig. 3.

Referring now more particularly to the characters of reference on the drawing, the seeder includes, as is usual, a frame 1 arranged at the forward end with a hitch 2 and supported at the other end by wheels 3 carried on a rotatably mounted axle 4. A furrow opening shoe 5 is fixed on and depends from the frame 1, while a seed hopper 6 is mounted so as to discharge into the furrow formed by the shoe.

A toggle link unit, comprising rigid links 7 and 8 pivoted at 9 for vertical breaking movement, is horizontally disposed above the frame in longitudinally extending position. Each link of the unit is pivoted intermediate its ends on the upper end of a vertical supporting bracket 10 mounted on and upstanding from the frame 1.

The outer end of link 7 is provided with a strike head 11 which is disposed for engagement by radial cams 12 formed on a cam disc 13 mounted on axle 4. The cams are equally spaced circumferentially of the disc and any desired number of cams may be used depending on the number of seeding operations required per wheel revolution.

Between the bracket pivot and the pivot 9 of link 7 the link carries a clevis 14 from which a rod 15 depends. The rod, at its lower end, passes through a base block 16 on the frame, and a compression spring 17 surrounds the rod between clevis 14 and block 16.

A seed container 18 is mounted in substantially vertical position on the outer end of link 8; the container being initially open topped and provided with a removable cover 19. The container is preferably cylindrical and at the lower end tapers down to form a longitudinally extending and relatively narrow seed feeding plate 20 which is formed with a row of spaced seed passage openings 21 each of a size to permit a single seed to pass therethrough. The container is disposed with the lower end thereof extending into the upper end of hopper 6, and the hopper is formed with a sight opening 22.

A vertical standard 23 is fixed on the frame adjacent the hopper and is provided at its upper end with a shock absorbing bumper 24 which is engaged by link 8 when links 7 and 8 are in alined horizontal position. Spaced guide arms 25 extend upward from the standard 23 and guide link 8 to and from bumper 24.

In operation, a supply of seeds is placed in container 18, but not enough to completely fill the same. As the seeder is moved along the ground and wheels 3 rotate, the cams 12 will recurringly engage and raise head 11 and break the toggle links downward as shown in Fig. 2. This raises the seed container somewhat and link 8 clears the bumper 24.

Then, as the cam escapes the head, spring 17 snaps the links back to an alined horizontal position and link 8 strikes bumper 24 causing a certain rebound. With such rebound, the seeds in the container are thrown toward the top of the container and as they fall back one seed will pass through each seed opening. By first throwing the seeds upward they tend to separate from each other and as they fall in separated relation, the fuzz thereon does not prevent passage of a predetermined number thereof through the openings 21. The "shaker" action produced assures proper feeding of the seeds and prevents stoppage of the seed passage openings 21. The seeds from the container fall into the hopper 6 and are fed into the furrow formed by shoe 5. Sight opening 22 in the hopper is provided so that the operator can watch the feeding operation and particularly the discharge of seeds through plate 20 of the seed container.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a seeder, a seed container mounted for up and down movement and having seed passage openings in its bottom, instrumentalities intermittently functioning in successive order to positively raise and then release the container, and when released to impart a relatively rapid downward movement thereto and a stop element to suddenly halt the downward movement of the container.

2. A structure as in claim 1, in which said stop element is formed of resilient material whereby to impart a rebounding action to the container before a subsequent positive raising action is imparted thereto.

3. In a wheeled seeder, a seed container having seed passage openings in the bottom thereof, a two-link toggle unit, each link being pivotally supported intermediate its ends for movement in a vertical plane, and the links being normally disposed in a predetermined position relative to each other, the container being fixed on the outer end of one link, a cam disc mounted on the seeder axle and arranged to intermittently engage the outer end of the other link and break the links downward, and to then suddenly release the same, a spring arranged in connection with the link unit and urging the links to said normal position, and a stop element to prevent the links from breaking upward from their normal position.

4. A device as in claim 3 in which the spring is of the compression type and engages said other link inwardly of its pivot; and in which the stop element is engaged by said one link outwardly of its pivot.

5. A seed including a frame, wheels supporting the frame, a seed container having bottom seed discharge openings, a toggle link unit pivoted on the frame for oscillation in a vertical plane, and connected at one end to the container, means between one wheel and the unit to engage and move the unit in one direction to raise the container and arranged to then suddenly release the unit, separate means acting on the unit to then lower the container with a relatively rapid movement and a resilient bumper positioned to be engaged by the unit after a predetermined downward movement of the container.

GIACOMO S. BRACCHIGLIONE.